Dec. 15, 1925.
A. LAUKHUFF
1,565,654
CUTTING MACHINE
Filed June 19, 1923
4 Sheets-Sheet 1
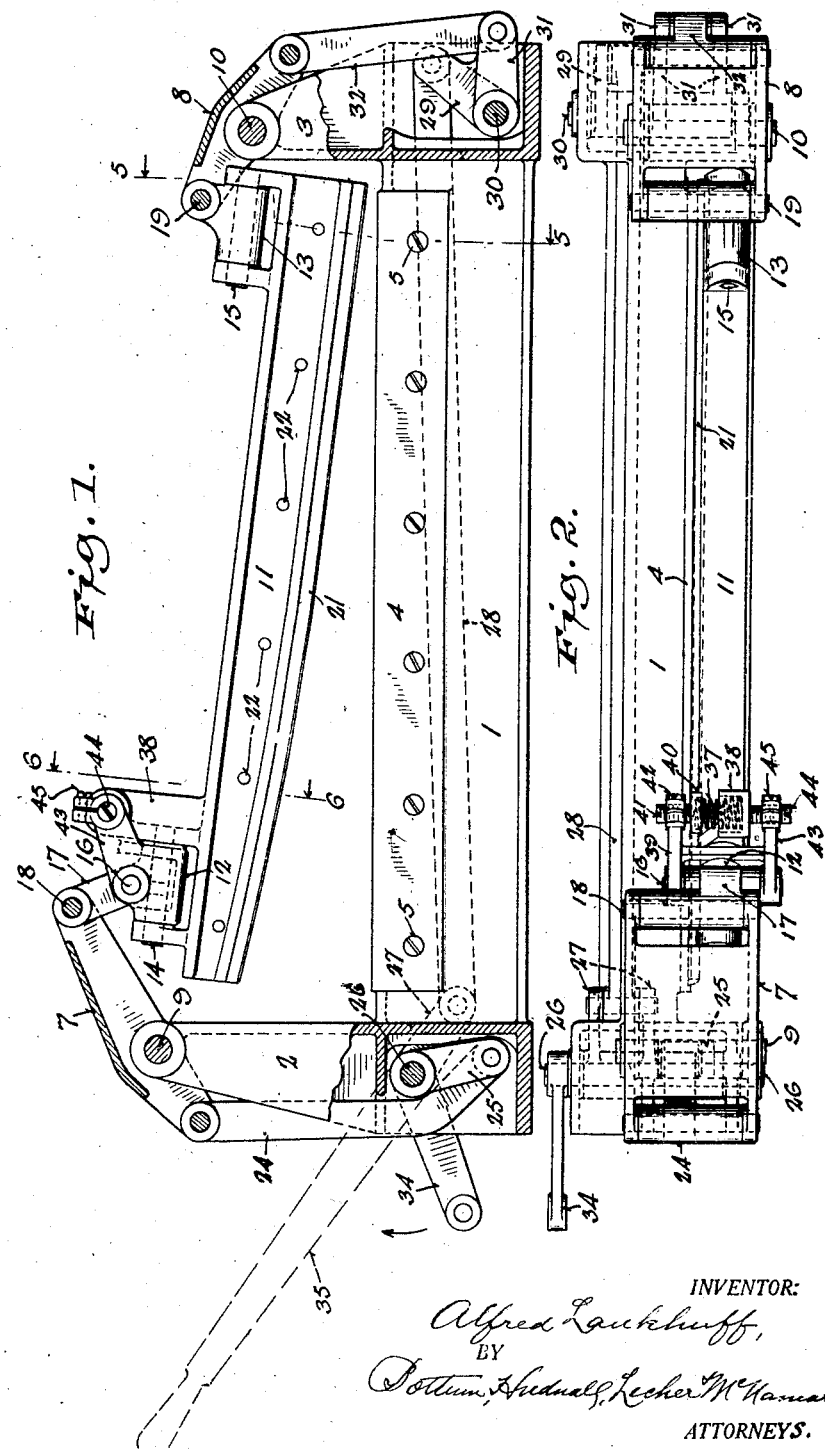
INVENTOR:
Alfred Laukhuff,
BY
Bottum, Hudnall, Lecher & McNamara,
ATTORNEYS.

Dec. 15, 1925.  1,565,654
A. LAUKHUFF
CUTTING MACHINE
Filed June 19, 1923  4 Sheets-Sheet 2
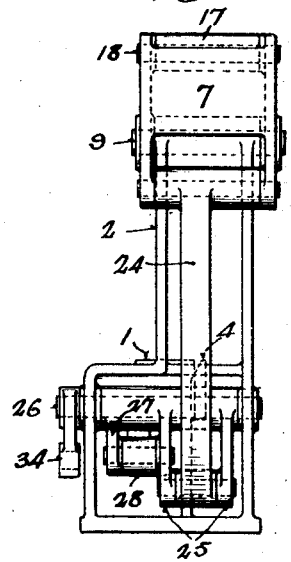
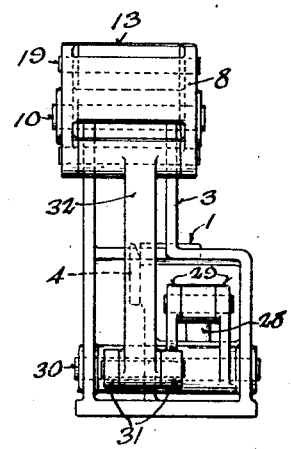
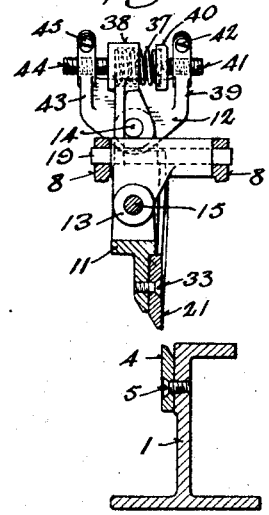
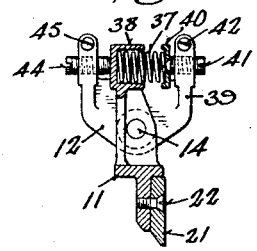
INVENTOR:
Alfred Laukhuff
BY
ATTORNEYS.

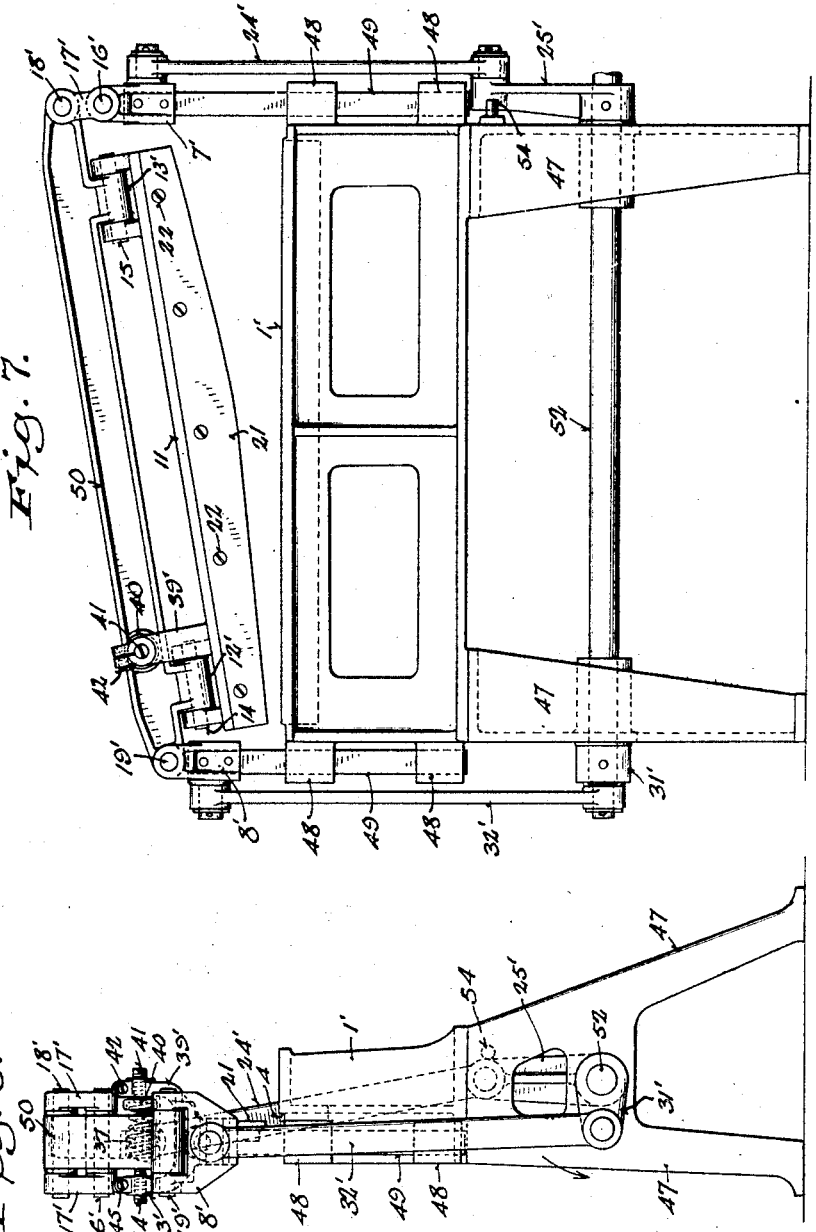

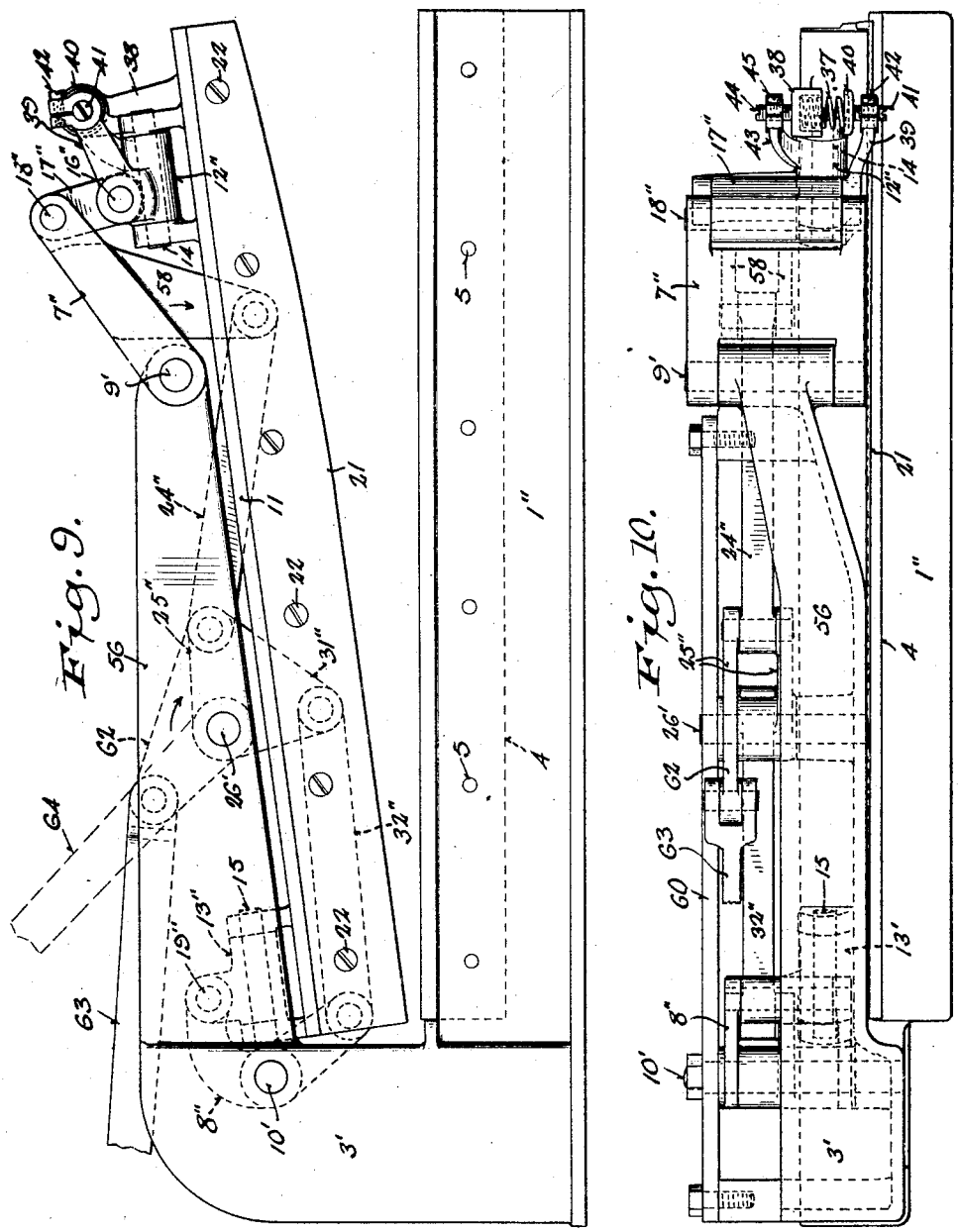

Patented Dec. 15, 1925.

1,565,654

UNITED STATES PATENT OFFICE.

ALFRED LAUKHUFF, OF SHOREWOOD, WISCONSIN.

CUTTING MACHINE.

Application filed June 19, 1923. Serial No. 646,330.

*To all whom it may concern:*

Be it known that I, ALFRED LAUKHUFF, a citizen of the United States, residing at Shorewood, in the county of Milwaukee and State of Wisconsin, have invented certain new and useful Improvements in Cutting Machines, of which the following is a specification, reference being had to the accompanying drawing, forming a part thereof.

This invention relates to machines for cutting various materials such as knitted and woven fabrics, leather, paper, etc.

Its main objects are with light pressure between the blades and with short strokes of the movable blade, to produce clean cuts, particularly in cutting sheer fabrics; to maintain a substantially constant cutting angle between the blades their entire length; to insure uniform clearance and pressure between the blades as the point of contact between their cutting edges progresses from one end thereof to the other; to prolong the life of the blades and make them self-sharpening; and generally to improve and facilitate the construction and operation of machines of this class.

It consists in the construction, arrangement and combination of parts as hereinafter particularly described and pointed out in the claims.

In the accompanying drawing like characters designate the same parts in the several figures.

Figure 1 is a rear elevation, parts being broken away and shown in section, of a cutting machine embodying the invention; Fig. 2 is a plan view of the machine; Fig. 3 is an end elevation as viewed from the left relative to Fig. 1; Fig. 4 is an end elevation as viewed from the right relative to Fig. 1; Fig. 5 is a vertical section of the machine on the line 5—5, Fig. 1; Fig. 6 is a cross section on the line 6—6, Fig. 1, of the upper knife or blade and knife bar; Fig. 7 is a front elevation of a machine of a modified construction embodying the invention; Fig. 8 is an end elevation as viewed from the left relative to Fig. 7; Fig. 9 is a front elevation of another modification of the machine; and Fig. 10 is a plan view of the same.

Referring to Figs. 1 to 6 inclusive, the machine has a frame comprising a horizontal knife or blade-supporting bed or bar 1, provided at the ends with posts or uprights 2 and 3, which may be cast integrally as shown, with the bed. A stationary blade or knife 4, is removably fastened as by screws 5, to the rear vertical face of the bed or bar 1.

Two vertically rocking levers or blade-supporting members 7 and 8, are fulcrumed between their ends on cross pins 9 and 10 in the upper ends of the posts 2 and 3.

A vertically movable blade or knife-supporting bar 11, is pivotally supported from the inner overhanging ends of the levers 7 and 8 by sleeves or pivot heads 12 and 13, connected by longitudinally aligned pins 14 and 15 with upwardly projecting lugs or ears on the upper side of the bar. The pivot head 12 is connected on the upper side by a pin 16 transverse to the pin 14 with the lower end of a link 17, the upper end of which is connected with the lever 7 by a pin 18, parallel with the pin 16. The pivot head 13 is connected on the upper side by a pin 19 transverse to the pin 15, directly with the lever 8.

A blade or knife 21 is detachably fastened as by screws 22, to the bar 11, in position to cooperate with the stationary blade 4.

The movable blade 21 is slightly inclined lengthwise relative to the stationary blade 4, as shown by full and dotted lines in Fig. 2, so as to produce and maintain effective progressive engagement between the cutting edges of the blades, and uniform clearance between the blades behind the point of engagement between their edges as they are brought together.

The outer end of the lever 7 is connected by a link 24 with an arm 25 of a bell crank lever fixed on a shaft 26, which is mounted in bearings in the lower part of the frame parallel with the pin 9. Another arm 27 of said lever is connected by a link 28 with an arm 29 of a bell crank lever fulcrumed on a pin 30 adjacent the opposite end of the bed 1 in the lower part of the frame parallel with the pin 10.

Another arm 31 of the last mentioned lever is connected by a link 32 with the outer end of the lever 8.

The machine may be operated by hand or by power. For operating it by power, the shaft 26 is provided with an arm 34 for connecting it by a link with a crank (not shown) which may be driven by an electric motor or otherwise. For operating the machine by hand, the shaft 26 may be provided with a hand lever 35, as indicated by dotted lines in Fig. 1, in place of or in addition to the arm 34.

The lever arms 25 and 31 are so set, proportioned and connected with each other and with the levers or blade-supporting members 7 and 8, that in moving the blade 21 downward from its normal position in which it is shown in Fig. 1, a rapid initial, followed by a retarded movement, will be imparted by the lever arm 31 to the right hand or leading end of the blade, as seen in Fig. 1, and a slow initial, followed by an accelerated and greater movement, will be imparted by the lever arm 25 to the left hand or trailing end of the blade, and the blade with a comparatively short stroke will make a complete cut and maintain a substantially constant cutting angle with the stationary blade 4.

The link 24 is bent as shown in Fig. 1, to permit the lever arm 25 to reach or pass in its downward movement, a dead center, so as to stop and lock or hold the bar 11 with the blade 21 at the limit of its upward opening movement when the link is brought into engagement with the hub of the lever arm.

The cutting edge of the blade 21 is curved or inclined upwardly adjacent its left hand or trailing end, as shown in Fig. 1, so as to approximate more closely to a constant cutting angle between the blades the entire length of the upper blade, and the composite movement of the blade 21 obtained by its lever supporting and actuating connections hereinbefore described, further contributes to maintain a substantially uniform or constant cutting angle throughout the entire stroke of the movable blade and materially reduces the extent or range of movement of the blade.

The lever arms which support the movable blade and impart the requisite movements thereto, are preferably forked, as shown, to afford extended pivot bearings and more firmly and accurately hold the movable blade in its proper relation to the stationary blade.

To maintain a uniform pressure of the cutting edge of the movable blade 21 against the cutting edge of the stationary blade 4 throughout the entire stroke of the movable blade, a spring 37 is interposed between the bar 11 and a part or member with which it is pivotally connected.

In the present case, as shown most clearly in Figs. 2, 5 and 6, the spring 37 is interposed between an arm 38 on the bar 11 and an arm 39 on the pivot head 12 above and transversely to the axial line of the pivot pins 14 and 15. The arm 38 is formed adjacent its upper end with a socket or seat to receive and hold one end of the spring, the other end of which bears against a cupped washer or spring seat 40. The spring seat 40 is engaged and supported by the point of an adjusting screw 41, threaded in a split collar or nut formed with the arm 39 and provided with a clamping screw 42 for locking and holding the adjusting screw 41 in adjusted position. In a similar arm 43 on the pivot head 12 an adjustable stop screw 44 is threaded in position to engage the arm 38 of the bar 11 on the opposite side thereof from the spring 37, for limiting the movement of the cutting edge of the blade 21 towards the plane of the stationary blade 4 and thereby preventing interference between the leading end of the movable blade and the corresponding end of the stationary blade at the beginning of a cut. The corner of one of the blades at the ends which are first brought together in closing, is slightly beveled to swing the movable blade out of engagement with the stop screw 44, and permit the spring 37 to press and yieldingly hold the cutting edge of the blade 21 against the cutting edge of the blade 4. The stop screw 44 is locked in adjusted position by a clamping screw 45 like or similar to the clamping screw 42, for locking the adjusting screw 41 in place.

Referring to Figs. 7 and 8, showing a modification of the machine, the bed 1' for the stationary blade 4 is provided at the ends with legs 47 for setting the machine on a floor, and with bearings 48 for vertical slide bars 49. The bars 49 are provided at their upper ends with heads or blade supporting members 7' and 8'.

The yoke 50 is pivotally connected at one end by a cross pin 18' with the upper end of a link 17', the lower end of which is connected by a pin 16' with the head 7'. The other end of the yoke 50 is connected by a cross pin 19' directly with the head 8'. The yoke 50 is formed or provided on the under side with sleeves or pivot heads 12' and 13', which are connected by longitudinally aligned pins 14 and 15 with the movable blade supporting bar 11.

The head 7' is connected by a link 24' with a crank or lever arm 25' fixed at one end of the machine on a horizontal rocker shaft 52 which is supported in bearings in the legs 47 below and parallel with the bed 1' and stationary blade 4.

The head 8' is connected in like manner by a link 32' with a crank or lever arm 31' fixed on the shaft 52 at the opposite end of the machine.

The crank or lever arms 25' and 31' are set at an angle to each other as shown, so that in the closing or downward movement of the blade 21 a rapid initial followed by a retarded movement will be imparted to the left hand or leading end of the blade, and a slow initial followed by an accelerated and greater movement will be imparted to the right hand or trailing end of the blade and with a comparatively short movement or stroke the blade will make a complete cut and maintain a substantially constant cutting angle with the stationary blade 4.

The plane of the upper movable blade 21 is slightly inclined lengthwise thereof to the plane of the stationary blade 4, as shown in Fig. 2, so as to produce and maintain effective progressive engagement between the cutting edges of the blades and uniform clearance between the blades behind the point of engagement between their edges as they are brought together.

To maintain a uniform yielding pressure between the blades in cutting, provision is made like or similar to that shown in Figs. 1, 2, 5 and 6. In the present case the spring 37 is interposed between the yoke 50 and an arm 39' extending upwardly from the bar 11 and provided at its upper end with a split nut and clamping screw 42 and an adjusting screw 41 engaging and supporting the spring seat 40.

For limiting the swinging movement of the blade 21 on the pivot pins 14 and 15 towards the plane of the stationary blade 4, the adjustable stop screw 44 is threaded in an arm 43' extending upwardly from the bar 11 on the opposite side of the yoke 50.

At the end of its upward movement the crank arm 25' passes its dead center against a stop 54 on the frame and locks and holds the yoke 50 with the bar 11 and movable blade 21 in its upper position, as shown in Fig. 7.

The machine may be operated manually by a hand lever (not shown), fixed on the shaft 52 at the right hand end of the machine, or by an arm fixed on the shaft and connected with a crank (not shown), driven by a motor.

Except as hereinbefore particularly described, the machine as shown in Figs. 7 and 8 is substantially like the machine shown in Figs. 1 to 6 inclusive, in construction and operation.

Referring to Figs. 9 and 10 showing another modification of the machine, in which there is a clear opening for the introduction of material to be cut between the blades at one end of the machine, the bed or bar 1" to which the lower stationary blade 4 is fastened, is provided at one end with a post or upright 3' having an arm 56 extending horizontally over the bed.

The bar 11 to which the upper movable blade 21 is fastened, is suspended from levers or supporting members 7" and 8". The lever 7" is fulcrumed to the overhanging end of the arm 56 by a cross pin 9' and is connected with the upper end of a link 17" by a parallel pin 18", the lower end of the link being connected by a parallel pin 16" with the sleeve or pivot head 12". The lever 8" is fulcrumed on a cross pin 10' in the upper part of the post 3' and is directly connected at its upper overhanging end by a parallel cross pin 19" with the sleeve or pivot head 13".

A depending arm 58 of the lever 7" is connected by a link 24" with an arm 25" of a bell crank lever, which is fulcrumed on a cross pin 26' passing through the arm 56 about midway between and parallel with the pins 9' and 10'. The lower arm of the lever 8" is connected by a link 32" with an arm 31" of said bell crank lever.

The arms of the levers 7" and 8" and the arms 25" and 31" of the bell crank lever are forked, as shown in Fig. 10, to provide extended pivot bearings and firmly support the movable blade 21 in proper working relation to the fixed blade 4.

A bar 60 bolted to the post 3' and the overhanging end of the arm 56, supports the ends of the pivot pins 10' and 26' on the opposite sides of the bell crank arms 25" and 31" and of the lever 8" from the arm 56.

The machine as shown in Figs. 9 and 10 may be operated either by power or by hand.

For operating it by power, the bell crank lever is provided with an extra arm 62, which is connected by a link 63 with a crank driven by an electric motor or from any convenient source of power.

For operating the machine manually, a hand lever 64, as indicated by dotted lines in Fig. 9, may be fastened to the arm 62, or the lever arm may be extended to form the hand lever.

Substantially the same provision may be made in this form of the machine, as shown in Figs. 1, 2, 5 and 6, for maintaining a uniform pressure of the cutting edge of the movable blade 21 against the cutting edge of the stationary blade 4, and for maintaining effective progressive engagement between the cutting edges of the blades, a substantially constant cutting angle, and uniform clearance between the blades behind the point of engagement between their edges throughout the cutting stroke of the movable blade.

The machine as shown in Figs. 1 to 6 inclusive, or in Figs. 9 and 10, may be mounted on a bench, table or shelf, or may be provided as shown in Figs. 7 and 8, with legs for standing on a floor. Each of the several forms of the machine shown is to be provided with a suitable work supporting table, clamp and gages (not shown) for properly positioning and holding the material to be cut.

The wiping action of the movable blade on its up-stroke against the stationary blade sharpens the blades, and the uniform light pressure of the movable blade against the stationary blade prolongs the life of the blades.

The operation of the machine as embodied in any of the several forms or designs shown, will be apparent from the foregoing description of its construction.

Various modifications other than those particularly shown and described in the construction and arrangement of parts of the machine may be made without departure from the principle and scope of the invention as defined in the following claims.

I claim:

1. In a cutting machine the combination of relatively movable blades and mechanism adapted to close the blades with a retarded shorter movement at one end and an accelerated longer movement at the other end.

2. In a cutting machine the combination of a relatively stationary blade, a movable blade, and crank arms connected with the movable blade adjacent its ends and arranged to impart a comparatively rapid initial movement followed by a retarded closing movement to one end and a comparatively slow initial movement followed by an accelerated closing movement to the other end of the movable blade.

3. In a cutting machine the combination of two blades one of which is movable relatively towards and from the other at an angle thereto, and means adapted to close one end of the movable blade with a retarded movement and the other end with an accelerated movement and to hold the blade open.

4. In a cutting machine, in combination, a frame, a stationary knife secured to said frame, a bar having a knife secured thereto, a sleeve pivotally connected at each end of said bar and arranged to permit adjustment of said movable knife with respect to said stationary knife, a spring arranged to act upon said bar and one of said sleeves to maintain a substantially constant pressure between the cutting edges of said knives, and connections between said bar and said frame to effect movement of said movable knife with respect to said stationary knife.

5. In a cutting machine, in combination, a frame, a stationary knife secured to said frame, a bar having a knife secured thereto, said bar being provided with an arm adjacent one end thereof, a sleeve pivotally connected at each end of said bar and arranged to permit adjustment of said movable knife with respect to said stationary knife, a spring arranged between said sleeve and said arm to maintain a substantially constant pressure between the cutting edges of said blades, and connections between said bar and said frame to effect movement of said movable knife with respect to said stationary knife.

6. In a cutting machine the combination of fixed and movable blades, blade supporting members movable towards and from the fixed blade and carrying the movable blade, and crank arms connected with each other and with said supporting members and adapted to simultaneously impart a retarding closing movement to the leading end and a greater accelerating closing movement to the trailing end of the movable blade.

7. In a cutting machine the combination of a frame provided with a knife bed, a stationary blade removably mounted on the bed, supporting members carried by the frame and movable towards and from the knife bed, a knife bar connected adjacent its ends with said supporting members, a blade removably mounted on said bar, and means adapted to simultaneously actuate said supporting members and to impart a retarding closing movement to the leading end and an accelerating closing movement to the trailing end of the movable blade.

8. In a cutting machine the combination of a frame, a stationary blade fastened to the frame, a movable bar, a blade fastened to said bar in position to cooperate with the stationary blade, pivot heads having aligned pivot connections with said bar lengthwise thereof, supporting and actuating connections between the movable bar and frame adapted to impart a retarding movement to the leading end of the movable blade and a longer accelerating movement to the trailing end of the movable blade towards the stationary blade, and means uniformly and yieldingly pressing the cutting edge of the movable blade towards the plane of the stationary blade throughout the entire extent of engagement between the blades.

9. In a cutting machine the combination of a frame, a stationary blade removably attached thereto, a bar movable towards and from the stationary blade, pivot heads having aligned pivot connections with said bar lengthwise thereof, levers connecting the pivot heads with the frame and movably suspending said bar from the frame, actuating lever arms connected with said suspending levers and adapted to simultaneously impart a retarding movement to the leading end of the movable blade and a longer accelerating movement to the trailing end thereof towards the stationary blade, and means yieldingly pressing the cutting edge of the movable blade towards the plane of the stationary blade.

10. In a cutting machine the combination of a frame comprising a bed and posts at the ends of the bed, a blade removably attached to the bed, blade supporting levers connected with the posts on parallel fulcrum pins transverse to the stationary blade, pivot heads pivotally connected with the inner ends of said levers by pins parallel with the fulcrum pins of the levers, a blade supporting bar pivotally connected with said pivot heads by aligned pins lengthwise of the bar and transverse to the fulcrum pins of the levers, actuating levers connected with the frame by fulcrum pins below and parallel with the fulcrum pins of the blade supporting levers, links connecting said actuating levers with each other and with said blade supporting levers, a blade removably attached to said bar, a spring tending to swing the cutting edge of the movable blade towards the plane of the stationary blade, and an adjustable stop limiting the movement of the movable blade by the spring towards the stationary blade.

11. In a cutting machine, in combination, a frame, a stationary knife secured to said frame, a lever supported by said frame at each end thereof, a knife pivotally connected at the ends thereof to the ends of said levers, said movable knife being arranged for movement with respect to said stationary knife and for cooperation therewith to cut material, and means connected to said levers to effect movement of said movable knife.

12. In a cutting machine, in combination, a frame, a stationary knife secured to said frame, a lever supported by said frame at each end thereof, a knife pivotally connected at the ends thereof to the inner ends of said levers, said movable knife being arranged for movement with respect to said stationary knife and for cooperation therewith to cut material, and means connected to said levers to effect movement of said movable knife, said levers and said means being arranged to impart a comparatively rapid initial movement followed by a retarded closing movement to one end of said movable knife and to impart a comparatively slow movement followed by an accelerated closing movement to the other end of said knife.

13. In a cutting machine, in combination, a frame, a stationary knife secured to said frame, a lever supported by said frame at each end thereof, a knife pivotally connected at the ends thereof to the inner ends of said levers, said movable knife being arranged for movement with respect to said stationary knife and for cooperation therewith to cut material, and means connected to said levers to effect movement of said movable knife, said levers and said means being arranged to maintain a substantially constant cutting angle between said blades.

14. In a cutting machine, the combination with blades arranged for cooperation with each other, of means adapted to effect relative movement of adjacent end portions of said blades at decreasing and increasing rates respectively.

15. In a cutting machine, the combination with blades arranged for cooperation with each other, of means adapted to effect successive relative movement of adjacent end portions of said blades at decreasing and increasing rates respectively.

16. In a cutting machine, the combination with a fixed blade, and a movable blade supported and arranged for cooperation therewith, of means adapted to close one end of said movable blade with a retarded movement and the other end thereof with an accelerated movement.

17. In a cutting machine, the combination with blades arranged for cooperation with each other, of means adapted to effect relative movement of adjacent end portions of said blades at decreasing and increasing rates respectively upon operation of said means at substantially a constant rate of speed during the cutting action of said blades.

18. In a cutting machine, the combination with blades arranged for cooperation with each other, of means adapted to effect relative movement of said blades, said means having a dead-center position which is passed when said blades are in open position whereby the latter are held in said open position until further movement of said means.

In witness whereof I hereto affix my signature.

ALFRED LAUKHUFF.